United States Patent [19]

Mathai et al.

[11] 4,362,770

[45] Dec. 7, 1982

[54] NITROCELLULOSE-FREE PRIMER-SURFACER

[75] Inventors: John Mathai; Larry J. Morrison, both of Chicago, Ill.

[73] Assignee: The Sherwin-Williams Company, Cleveland, Ohio

[21] Appl. No.: 250,442

[22] Filed: Apr. 2, 1981

[51] Int. Cl.³ .......................... B05D 1/36; B05D 7/00
[52] U.S. Cl. ................................. 427/409; 427/412.1; 524/379
[58] Field of Search .................... 260/33.4 R; 427/409, 427/412.1; 524/379

[56] References Cited

U.S. PATENT DOCUMENTS

| | | | |
|---|---|---|---|
| 3,272,647 | 9/1966 | Swanson et al. | 117/75 |
| 3,325,443 | 6/1967 | Christenson et al. | 260/41 |
| 3,505,269 | 4/1970 | Jeffery et al. | 260/32.8 |
| 3,509,086 | 4/1970 | Rohrbacher | 260/32.8 |
| 3,627,779 | 12/1971 | Standstedt | 260/31.8 |
| 3,666,710 | 5/1972 | Makhlouf et al. | 260/33.6 |
| 3,705,076 | 12/1972 | Usala | 161/189 |
| 3,746,673 | 7/1973 | Simms et al. | 260/22 |
| 3,764,587 | 10/1973 | Zunker | 525/176 |
| 3,962,369 | 6/1976 | Chang et al. | 260/849 |
| 4,042,539 | 8/1977 | Fanning | 260/16 |

Primary Examiner—Joseph L. Schofer
Assistant Examiner—N. Sarofim
Attorney, Agent, or Firm—Robert E. McDonald; James V. Tura; Stephen A. Littlefield

[57] ABSTRACT

Disclosed is a primer-surfacer composition comprising a vehicle of a balanced acrylic polymer of methyl methacrylate, butyl methacrylate and methacrylic acid, the resultant polymer having an acid value in the range of about 25 to 35, the polymer having a relative viscosity of about 16 to 32 poise measured at 40% polymer solids in a toluene and isopropyl alcohol solvent at 25° C. The primer-surfacer may also contain dispersed pigments and/or fillers such as carbon blacks, talc, iron oxide, clay, etc. The primer-surfacer composition is primarily used over unprimed, primed or previously finished metal or plastic substrates to provide a surface to which an acrylic lacquer, an acrylic enamel, an alkyd enamel or a polyurethane enamel coating can be applied. The primer-surfacer of this invention may be easily sanded to provide a finish for vehicles of excellent intercoat adhesion, excellent chip and corrosion resistance and excellent fill.

20 Claims, No Drawings

NITROCELLULOSE-FREE PRIMER-SURFACER

BACKGROUND OF THE INVENTION

This invention relates to the art of paint primer-surfacer compositions, and more particularly, to a nitrocellulose-free primer-surfacer comprising an acrylic polymer vehicle or binder.

Primer and primer-surfacer compositions are known, particularly in the automotive industry and are applied over metal and/or plastic substrates in order to provide intercoat adhesion between the surface of the substrate and the decorative/protective top coat. Primer-surfacers also perform an additional function of filling minor flaws in the surface of the substrate which, upon sanding of the primer-surfacer, renders a smooth surface for application of the top coat. Such primer surfacers usually require a number of coats in order to attain the desired thickness of coating to cover minor surface imperfections and allow for sanding which also enhances top coat adhesion.

Until recently, nitrocellulose was the main binder ingredient in prior art primer surfacers. Because of the expense as well as the hazards involved in the use of nitrocellulose, several formulations have been developed as substitutes for nitrocellulose. Typical formulations include epoxy-terminated polyester complexes, aziridinyl-terminated esters, amine-modified acrylic resins and combinations of these polymers. Patents illustrating these types of formulations include U.S. Pat. Nos. 3,272,647 to Swanson et al, 3,345,388 to Yocum, 3,505,269 to Jeffery et al, 3,509,086 to Rohrbacher, 3,627,779 to Sandsteadt, 3,666,710 to Makhlouf et al, 3,746,673 to Simms et al, 3,962,369 to Chang et al and 4,042,539 to Fanning.

Although the above primer-surfacer formulations are of high quality and have found market acceptance, their efficiency with regard to drying time, number of coats required to fill to a smooth surface, corrosion resistance, solvent emmissions and intercoat adhesion require improvement.

SUMMARY OF INVENTION

In accordance with the invention, a coating system for metal and plastic substrates, comprises a preliminary primer-surfacer coat applied to the substrate and a finish coat selected from acrylic lacquers, enamels and urethane coatings applied over the primer-surfacer. The primer-surfacer comprises 35 to 67 percent by weight of an acrylic polymer vehicle consisting essentially of a copolymer of methyl methacrylate, butyl methacrylate and methacrylic acid, the resultant copolymer having an acid number of about 25 to 35.

Further in accordance with the invention, the aforementioned primer-surfacer further includes a solvent consisting essentially of 90-99% toluene and 1-10% isopropanol.

Still further in accordance with the invention, the aforementioned primer-surfacer composition also includes pigments and/or inert fillers in an amount up to about 40% of the total primer-surfacer composition.

Further in accordance with the invention, the acrylic primer-surfacer may be applied to the surface of a properly prepared metal or plastic substrate by direct application such as by brush or roller or, preferrably, reduced with an inert solvent and sprayed onto such prepared surface.

Still further in accordance with the invention, the primer-surfacer as previously described further includes a stabilizer which assists in retarding settling of the primer-surfacer components, particularly when reduced for spraying.

It is therefore an object of this invention to provide a coating system comprising a primer-surfacer coat and a top coat wherein only a minimal number of coats of such primer-surfacer are required for purposes of fill.

It is another object of this invention to provide a primer-surfacer composition of high solids content which affords a lesser amount of solvent emissions to the atmosphere than prior primer-surfacers.

It is yet another object of this invention to provide a coatings system wherein a primer-surfacer of high volume solids offers improved flexibility, excellent salt spray resistance, outstanding intercoat adhesion and excellent hold out of the top coat.

These and other objects of the invention are accomplished through a novel formulation of the primer-surfacer of this invention to be described hereinafter.

DESCRIPTION OF ONE PREFERRED EMBODIMENT OF THE INVENTION

The invention will now be described in the more limited aspects of a preferred embodiment thereof. It will be understood that such description is intended for the purposes of illustration of the invention only and not for the purpose of limiting same.

In accordance with the invention, an acrylic polymer vehicle for a nitrocellulose-free primer-surfacer is prepared by free radical polymerization of balanced amounts of methyl methacrylate, butyl methacrylate and methacrylic acid. Free radical initiators are used to carry out the polymerization reaction and may be any of those commonly used in the art such as, for example, organic peroxygen catalysts such as t-butyl perbenzoate, t-butyl peroctoate, di-benzoyl peroxide and azo-bis isobutryonitrile and combinations thereof. It will be understood that these catalysts are merely the preferred free radical initiators and that other common catalysts may be used.

The polymerization reaction mixture generally comprises, by weight of polymer solids, 30 to 60 percent methyl methacrylate, 35 to 65 percent butyl methacrylate and 2 to 6 percent methacrylic acid plus any effective amount of the above-described free radical initiator. Generally, the concentration of the free radical initiator will be in the range of about 0.1 to 2 percent by weight of the polymer solids in the reaction mixture.

The polymerization reaction is carried out in an inert organic solvent such as toluene. The reaction mixture is heated to about 200° to 220° F. and reacted for a period of about six to ten hours while maintaining the temperature within this range.

The reaction is continued until the viscosity of the mixture exceeds 1,000 poise and the polymer conversion reaches about 90 to 95 percent of the total monomer added. The polymer solids are reduced with additional inert organic solvent to about 42.5% polymer solids and held at 200° to 220° F. until the monomer conversion is complete. At this point, the reaction mixture viscosity is approximately 1,000 to 1,500 poise in toluene.

The vehicle is then preferably further reduced by the addition of isopropanol to about 40 percent polymer solids with constant mixing at about 200° F. After a period of one (1) hour, the viscosity has dropped to about 16 to 50 poise. The polymer should have an acid value in the range of about 25 to 35 and a molecular weight of approximately 75,000 to 150,000.

Regarding the acid value range, it has been found that a low acid value results in a primer-surfacer of low adhesion and low corrosion protection. If the polymer has a relatively high acid value above the stated range, the primer-surfacer will have a tendency to absorb water. The principal acid value controlling agent in the polymer formulation is the methacrylic acid. The methacrylic acid content is therefore held in the range of about 1 to 10 percent by weight of polymer solids and preferrably 2 to 6 percent by weight of polymer solids.

Although toluene and/or a toluene/isopropanol 95/5% mixture constitute the usual solvents for the primer-surfacer composition of this invention, other aromatic hydrocarbons alone or in combination with alcohols, ethers, ketones, and cycloaliphatic hydrocarbons may be used. The preferred solvent blend comprises 1 to 10 percent isopropanol and 90 to 99 percent toluene for the preparation of the polymeric vehicle.

In the preparation of the primer-surfacer of this invention, an amount of the above acrylic polymer vehicle (about 40% polymer solids, viscosity 16 to 50 poise and acid value 25 to 35) is combined with pigments and inert fillers so that the acrylic polymer/solvent mixture comprises 35 to 65 percent by weight of the primer-surfacer.

Pigments are preferably combined with the acrylic polymer and constitute about 25 to 50 percent by weight of the resultant primer-surfacer. Any pigments or fillers known in the art such as organic dyes and lakes as well as metallic oxides, metalo-organics, carbon blacks, talc, clays and the like may be used.

The balance of the primer-surfacer composition generally comprises additional solvents of the types previously mentioned. A preferred solvent comprises a mixture of isopropanol, methyl isobutyl ketone and butyl acetate along with the vehicle solvent of toluene and isopropanol.

The primer-surfacer of the above composition may then be applied directly to a substrate such as metal or plastic automotive vehicle bodies. The primer-surfacer may be applied to the substrate by conventional techniques such as spraying, dipping, flow coat and the like in a thickness of about 1.0 to 8.0 mils. Two to three coats may be required to build such thicknesses. The novel primer-surfacer of this invention provides good hold out and can be sanded down to a smooth and even surface after only a short drying time, approximately 15 to 30 minutes.

Particularly for spray application, it has been found that it is desirable to include a suspension stabilizer in the primer-surfacer composition. Although any common stabilizer may be used, a preferred stabilizer comprises a 10% solution of polyethylene in toluene, the polyethylene/toluene solution comprising up to about 10% (1 percent polyethylene) of the primer-surfacer composition.

A top coat of acrylic enamel, lacquer or urethane finish may then be applied directly to the primer-surfacer. The resulting finish has excellent appearance, good gloss, good crack and chip resistance and excellent corrosion resistance.

When compared with a similar, commercially available nitrocellulose-free primer-surfacer, the primer-surfacer of this invention is greatly superior in sanding, hold out, adhesion, salt spray resistance, humidity resistance as well as being faster drying and having a greater spreading rate at 2 mils thickness.

The following examples will illustrate the preparation of the preferred acrylic polymer vehicle as well as the primer-surfacer and the testing thereof.

EXAMPLE I

A glass lined reaction vessel equipped with an agitator, a condenser and a controllable rate gravity feed auxiliary supply tank and controllable heating unit is given initial charge of 9,600 pounds of toluene. The auxiliary supply tank is loaded with a mixture comprising 5,735 pounds methyl methacrylate, 6,350 pounds butyl methacrylate, 629 pounds methyacrylic acid and 26 pounds azo-bis isobutryonitrile addition catalyst. The solvent-containing reaction vessel is heated to about 200° F. with reflux condenser cooling. The mixed monomers of the supply tank are slowly admitted, with agitation, into the reaction vessel during a period of about 4 hours with all condensate being returned to the reaction vessel. The cooling is adjusted to maintain a temperature of about 210° F. to 220° F. for the exothermic reaction. The temperature is held at about 220° F. for an additional period of two hours until a monomer conversion of approximately 95% and a Gardner-Holt viscosity of over 1,000 poise is achieved. The auxiliary supply tank is then loaded with a mixture comprising 7,000 pounds toluene and 51 pound t-butyl perbenzoate addition catalyst. The contents of the supply tank is slowly admitted to the reaction vessel over a one (1) hour period. The remainder of the reaction (total monomer conversion) is carried out at about 220° F. After approximately two (2) more hours at this temperature, the polymerization reaction is complete. At this point, the acid value is approximately 33, the non-volatile solids content of the reaction mixture is about 42.5% and the viscosity is about 1,000 poise. The auxilary supply tank is then loaded with 2,586 pounds of isopropanol which is slowly admitted into the reaction vessel with all condensate being returned to the reaction vessel. The resulting acrylic polymer vehicle is soluble in alcohol, has a relatively low viscosity of 16 to 50 poise, a solids content of about 40% and has excellent clarity.

EXAMPLE II

A white primer-surfacer may be prepared using the acrylic vehicle of Example I by combining 52.3% by weight of the total primer-surfacer of the vehicle solvent of Example I with about 38% pigment solids and approximately 9.4% methyl ethyl ketone. The pigment solids comprise 4% by weight titanium dioxide, 33.3% talc and 1% clay, all percents being by weight of the total primer-surfacer composition. The primer-surfacer is then reduced by 100% with any common thinner for spray application. The sprayed primer-surfacer is quick drying and easily sanded while offering excellent fill properties and intercoat adhesion between the top coat and the substrate.

EXAMPLE III

A light gray primer-surfacer was prepared in accordance with the following procedure. To 461 pounds of the 40% acrylic resin prepared in accordance with Example I are added 50 pounds of a 10% solution of polyethylene in toluene, 8 pounds of di (2-ethylhexyl) azelate and 10 pounds of Bentone 34. This mixture is agitated at high speed for five minutes while adding 3 pounds furnace black, 71 pounds titanium dioxide and 291 pounds talc. This mixture is then agitated for an additional 45 minutes at a temperature between 140° F. and 160° F. The viscosity is then adjusted to 85-90 poise with the addition of 20 pounds isopropanol, 35 pounds methyl isobutylketone and 34 pounds of n-butyl acetate. This material is then milled for five hours at about 130° F. An additional 48 pounds of acrylic resin from Example I is added and, following a short period of mixing, the #3 Brookfield viscosity is about 35-45.

The resultant primer-surfacer comprises 40% nonvolatile material, is resistant to settling both as formed and as reduced for spraying and may be readily sanded after only fifteen minutes drying time following spraying.

Testing with the above acrylic primer-surfacer has shown that on cold rolled steel, galvanized steel, acid etched aluminum and sanded plastic sheet molding compound, the performance of the acrylic primer-surfacer is equal or superior to nitrocellulose primer-surfacers, alkyd primer-surfacers, acrylic polyester primer-surfacers and zinc chromate primers. With top coats of nitrocellulose acrylic lacquer, enamel, acrylic enamel and acrylic urethane, excellent gloss retention has resulted after 90 days exposure in a Florida atmosphere and good corrosion resistance is shown in a cross hatch scribe test.

While the invention has been described in the more limited aspects of a preferred embodiment thereof including specific examples, other embodiments of the invention have been suggested and still others will occur to those skilled in the art upon the reading and understanding of the foregoing specification. It is intended that all such embodiments be included within the scope of this invention as limited only by the appended claims.

What is claimed is:

1. In a coated substrate wherein the substrate is selected from a group consisting of ferrous and non-ferrous metals and plastics, and the coating comprises a preliminary primer-surfacer coat and a finish coat selected from a group consisting of acrylic lacquer, enamel and urethane coating applied over said primer, the improvement which comprises said primer-surfacer comprising 35-67 percent by weight inert solvent and 65-33 percent by weight of an acrylic polymer vehicle having an acid value of 25-35 and a viscosity ranging from 16-50 poise at about 40% polymer solids as measured in a toluene/isopropanol, 95%/5%, solvent at 25° C., said acrylic polymer vehicle consisting essentially of the polymerization reaction product of methyl methacrylate, butyl methacrylate and methacrylic acid with a free radical initiator.

2. The coating as set forth in claim 1 wherein said primer-surfacer further includes at least one pigment-/filler.

3. The coating as set forth in claim 2 wherein said at least one pigment-filler comprises 0-40% by weight of said primer-surfacer.

4. The coating as set forth in claim 3 wherein said pigment-filler comprises about 7% TiO$_2$, about 29% talc, about 0.3% furnace black and about 1.0% clay, all percentages being by weight of said primer-surfacer.

5. The coating as set forth in claim 1 wherein said acrylic polymer vehicle consists essentially of about 30% to 60% by weight methyl methacrylate, about 35% to 65% butyl methacrylate, about 2% to 6% by weight methacrylic acid and an effective amount of a free radical initiator, all percentages being by weight of acrylic solids in said vehicle.

6. The coating as set forth in claim 5 wherein said free radical initiator comprises 0.1 to 2% of said acrylic solids in said vehicle.

7. The coating as set forth in claim 6 wherein said free radical initiator consists essentially of azo-bis isobutyronitrile.

8. The coating as set forth in claim 7 wherein said free radical initiator further includes an organic peroxygen catalyst.

9. The coating as set forth in claim 5 wherein said acrylic polymer vehicle consists essentially of, by weight of polymer solids in said vehicle, about 50% butyl methacrylate, about 45% methyl methacrylate and about 5% methacrylic acid.

10. The coating as set forth in claim 9 wherein said vehicle also includes a solvent, said solvent being, by weight of solvent liquids, about 90-99% toluene and about 1-10% isopropanol.

11. The coating as set forth in claim 1 wherein said primer-surfacer further includes a suspension stabilizer.

12. The coating as set forth in claim 11 wherein said suspension stabilizer comprises a solution of polyethylene in toluene.

13. The coating as set forth in claim 1 wherein said acrylic polymer vehicle has an acid value of 30-35.

14. A nitrocellulose-free primer-surfacer composition comprising 35-67% by weight inert solvent and 65-33% by weight of an acrylic polymer vehicle, said acrylic polymer vehicle being a copolymer of methyl methacrylate, butyl methacrylate and methacrylic acid having a molecular weight ranging from 75,000 to 150,000, an acid value of about 25-35 and a viscosity measured at 40% polymer solids in a 95% toluene/5% isopropanol solvent at 25° C. of 16-50 poise.

15. The primer-surfacer composition as set forth in claim 14 wherein said inert solvent comprises 90-99% toluene and 1-10% isopropanol.

16. The primer-surfacer composition as set forth in claim 15 wherein said inert solvent further includes 0-5% methyl isobutyl ketone and 0-5% di (2-ethylhexyl) azelate, and 0-5% n-butyl acetate.

17. The acrylic primer-surfacer as set forth in claim 14 further including 0-40% by weight of said primer-surfacer as a pigment-filler.

18. The primer-surfacer as set forth in claim 17 wherein said pigment-filler comprises about 7% TiO$_2$, about 29% talc, about 0.3% furnace black and about 1.0% clay.

19. The primer-surfacer as set forth in claim 14 further including a suspension stabilizer.

20. The primer-surfacer as set forth in claim 19 wherein said suspension stabilizer comprises a solution of polyethylene in toluene.

* * * * *